United States Patent [19]
Johannsen et al.

[11] 3,743,401
[45] July 3, 1973

[54] PROJECTOR FOR SLIDES

[75] Inventors: Hans Werner Johannsen, Frankfurt/Main; Robert Oberheim, Neu-Isenburg, both of Germany

[73] Assignee: Braun Aktiengesellschaft, Frankfurt/Main, Germany

[22] Filed: Sept. 5, 1969

[21] Appl. No.: 855,521

[30]  Foreign Application Priority Data
Sept. 7, 1968    Germany..........P 17 97 276.8

[52] U.S. Cl. .....................353/52, 353/116, 353/119
[51] Int. Cl. ...............................................G03b 21/18
[58] Field of Search.................353/119, 103, 53, 116

[56]  References Cited
UNITED STATES PATENTS

| | | | |
|---|---|---|---|
| 2,537,429 | 1/1951 | Seyler | 353/103 |
| 2,705,438 | 4/1955 | Peto | 353/116 X |
| 2,969,711 | 1/1961 | Robinson et al. | 353/104 |
| 3,007,370 | 11/1961 | McMaster et al. | 353/119 X |
| 3,067,650 | 12/1962 | Pester | 353/119 X |
| 3,116,662 | 1/1964 | Rosenberger et al. | 353/53 |
| 3,125,820 | 3/1964 | Maiershofer | 353/103 |
| 3,221,598 | 12/1965 | Hall | 353/103 |

Primary Examiner—William D. Martin, Jr.
Attorney—Michael S. Striker

[57]  ABSTRACT

A slide projector wherein a block-shaped guiding and transporting unit supports indexible magazines for slides at a level below a block-shaped lamp-containing illuminating unit and a block-shaped objective-containing image projecting unit. The three units are mounted at one side of a vertical panel the other side of which supports the fan and the driving assembly for a vertically movable slide changer whose claws transport slides from a magazine on the guiding and transporting unit into registry with the other two units and vice versa. The housing of the projector comprises two separable shells one of which vormally conceals the driving assembly and the other of which conceals the three units when the projector is not in use.

10 Claims, 2 Drawing Figures

PATENTED JUL 3 1973 3,743,401

INVENTORS
HANS WERNER JOHANNSEN
ROBERT OBERHEIM
BY
Michael S. Striker
ATTORNEY

PROJECTOR FOR SLIDES

BACKGROUND OF THE INVENTION

The present invention relates to improvements in projectors for photographic transparencies, commonly known as slides. More particularly, the invention relates to improvements in the distribution and mounting of components in slide projectors of the type wherein the slide-engaging part of the slide changer is movable up and down to transport slides between a magazine and an operative position of registry with the illuminating and optical parts of the apparatus.

As a rule, the housing of a slide projector comprises a cupped shell which can be opened at the top and accommodates the slide changer, the projection lamp, the objective, other optical elements, the fan, the guide for magazines and the driving elements which operate the slide changer and index the magazine in a desired sequence or at the will of the operator. The electrical and mechanical driving elements are normally installed in the lower part of the shell, i.e., at a level below the optical parts. This presents serious problems during assembly of the projector and particularly when the electrical and mechanical elements must be adjusted, inspected, overhauled and/or replaced. In many instances, the optical elements are assembled into a discrete group which is separably installed in the shell above the remaining components of the projector. In order to save space, the components are placed close to each other which aggravates the situation when the projector must be overhauled, inspected or repaired.

SUMMARY OF THE INVENTION

An object of our invention is to provide a slide projector wherein the parts are assembled in a novel and improved way to facilitate access during adjustment, repair or replacement.

Another object of the invention is to provide a slide projector wherein the optical, illuminating and magazine-supporting and indexing components need not be dismantled when it becomes necessary to gain access to the elements which drive the slide changer, or vice versa.

A further object of the invention is to provide the slide projector with a novel frame and with a novel housing which protects all sensitive parts when the projector is not in use.

An additional object of the invention is to provide a slide projector wherein each of two or more groups of related or cooperating parts can be installed or removed as a unit.

A concomitant object of the invention is to provide a slide projector wherein the slides which are held in an operative position of registry with the projection lens are readily accessible for inversion, centering and/or replacement.

Still another object of the invention is to provide a slide projector which can accept many types of presently known slide magazines and which can employ several types of slide changers.

In accordance with a feature of the present invention, the slide projector comprises a frame including an upright supporting panel having a first side and a second side and preferably located in or close to the central longitudinal symmetry plane of the projector, manipulating means for slide magazines provided at one side of the panel and carried by the frame, preferably directly by the panel, an illuminating unit and an image projecting unit both located at the one side of the panel and carried by the frame so that the manipulating means is located at a level below the two units or vice versa, a slide changer having a slide-engaging portion movable up and down at the one side of the panel to transport slides between a magazine in the manipulating means and an operative position of registry with the two units, a driving assembly for the slide changer located at the other side of the panel and carried by the frame, and a housing including a first section separably secured to the frame at the other side of the panel to normally conceal the driving assembly and a second section separably secured to the frame at the one side of the panel to conceal the two units, the slide-engaging portion of the slide changer and the manipulating means when the projector is not in use.

The two units and the manipulating means preferably constitute discrete blocks which are attached directly to the one side of the panel and each of which is freely accessible when the second section of the housing is separated from the panel. The first section is removed only when the component parts of the driving assembly require inspection, replacement and/or repair.

The novel features which are considered as characteristic of the invention are set forth in particular in the appended claims. The improved projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
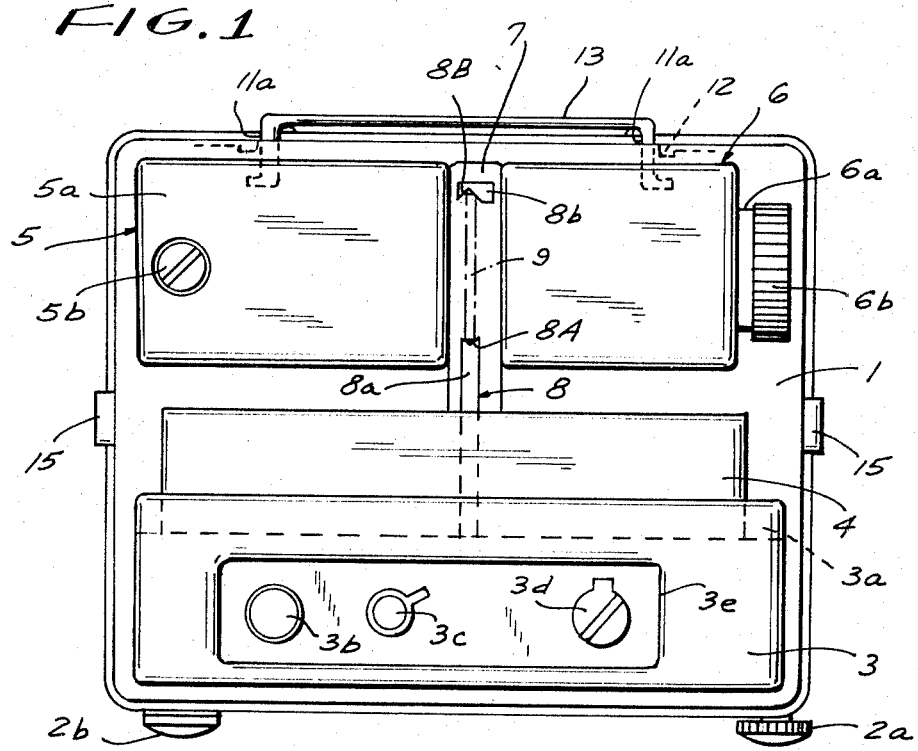
FIG. 1 is a side elevational view of a slide projector which embodies the invention, with one section of the housing removed.

The illustrated projector comprises a frame including an upright supporting panel 1 which is located in or close to the longitudinal central vertical symmetry plane of the apparatus. This panel supports all essential components of the projector including a group 1a which comprises a guiding and transporting device 3 for trays or magazines 4 (hereinafter called manipulating device), an illuminating unit 5, an image projecting unit 6, and a slide changer 8 which is movable up and down in a substantially vertical plane making a right angle with the plane of the panel 1. The group 1a is located at one side of the panel 1 and the other side of this panel supports a second group 1b which constitutes a driving assembly for the slide changer 8 and comprises a number of mechanical and electrical parts including a fan or blower 1A which serves to withdraw heat from the illuminating unit 5, i.e., from the projection lamp. The components of the group 1a are exposed and readily accessible when the projector is in use but the components of the driving assembly 1b are normally concealed by a section or shell 11 of a hollow housing which is separably secured to the panel 1 by screws, bolts or the like (not shown) so that it can be detached by a repairman.

The frame of the projector further includes three legs including a centrally located front leg 2a which is adjustable up and down to change the inclination of the optical axis of the objective in the unit 6, and two rear legs 2b, 2c which are mounted on a bridge 2 at the rear end of the panel 1. The bridge 2 extends transversely of and is located below the panel 1. The legs 2a–2c together form a stable three-point support for the panel 1 and for all parts which are mounted thereon.

The manipulating device 3 comprises an elongated upper part 3a which constitutes a guide or track for magazines 4 and is located at a level below the units 5 and 6. The guide 3a can support one, two or more magazines at a time or the device 3 may include two or more guides 3a. The casing of the manipulating device 3 below the guide 3a accommodates the customary indexing mechanism which can transport the magazine 4 forwardly or backwards to place a selected slide 9 into registry with the slide changer 8. The just mentioned casing constitutes a discrete building block which can be attached to and separated from the corresponding side of the panel 1 and the guide 3a constitutes the upper portion of such casing. As a rule, the magazines 4 of the type capable of being used in our projector comprise an elongated toothed rack which mates with a driving pinion (not shown) in the casing of the manipulating device 3. The pinion in indexed by the driving assembly 1b at desired intervals. The control means of the projector comprises a set of knobs all of which are installed in a depression or recess 3e provided in the outer vertical side wall of the casing of the manipulating device 3. These knobs include a knob 3b which can start or stop the motor of the projector, a knob 3c which can select the direction of travel of the magazine 4, and a knob 3d which selects the voltage for the electrical components of the projector. The recess 3e is preferably deep enough to completely accommodate the knobs 3b–3d so that they do not interfere with the application of a second removable housing section or shell 14.

The aforementioned illuminating unit 5 is installed behind the image projecting unit 6 at a level above the manipulating device 3 and accommodates the customary projection lamp as well as certain conventional optical components through which the projection light passes toward the objective in the unit 6. The casing 5a of the unit 5 is formed with customary ventilating slots (not shown) for air which is being circulated by the fan 1A. A single screw or an analogous fastener 5b is provided to separably secure the casing 5a to the panel 1 so that the lamp and other parts of the unit 5 are immediately accessible upon removal of the casing 5a. The fastener 5b has a diametral groove so that it can be readily engaged not only by a screwdriver but also by a coin if a more suitable tool is not available. The optical and electrical parts of the unit 5 behind the casing 5a are preferably mounted on a plate (not shown) which is secured to the panel 1.

The image projecting unit 6 includes an objective whose mount 6b has a helical groove 6a receiving a preferably elastic pin (not shown) which is mounted on the panel 1. The exterior of the lens mount 6b is knurled (see FIG. 1) so that it can be readily grasped by fingers in order to move the objective axially toward or away from the illuminating unit 5. The group 1b preferably includes a motor-operated focusing mechanism which can move the objective mount 6b axially; such remote focusing mechanism includes a driving member (not shown) which extends through the panel 1 and is operatively connected or connectable with the objective mount 6b.

An important advantage of the heretofore described parts of the slide projector is that all such components which require frequent attention or adjustment can be reached and adjusted in response to detachment of the housing section 14 as well as that the components are assembled in the form of three simple blocks (3, 5 and 6) which do not interfere with the operator's work when the operator must attend, for example, to the block 5 but not to the block 3 and/or 6. This is particularly important in connection with the units 5, 6 which contain all optical parts of the illuminating and image projecting means as well as the projection lamp and lens proper.

The slide changer 8 is movable up and down in a channel or space 7 between the units 5 and 6. This slide changer comprises a slide-engaging portion having an upper arm or claw 8b and a lower arm or claw 8a. The slide-engaging portion of the slide changer 8 resembles a tongs wherein the lower claw 8a is movable with reference to the upper claw 8b against the opposition of suitable springs or other biasing means (not shown) in a suitable vertical slot of the manipulating device 3. The lower claw 8a engages the frame of a slide 9 in the corresponding compartment of the magazine 4 from below and urges it against the upper claw 8b while the slide changer 8 moves upwardly to place the thus raised slide to an operative position in which the light issuing from the lamp in the unit 5 passes through the transparent portion of the slide and through the objective in the unit 6 to project the image onto a screen. The slide 9 which is located in the operative position is held only by the claws 8a, 8b of the slide changer 8 so that the illustrated projector need not be provided with special guides, ways, channels, grooves, gates or like parts which are employed in conventional slide projectors to properly locate and retain slides in operative position. When the projection of the image of the slide 9 is completed, the claws 8a, 8b move downwardly to return such slide into the corresponding compartment before the magazine 4 is indexed to place the next slide or a selected slide into registry with the slide changer 8. In a manner well known from the art and not specifically shown in the drawing, the upper claw 8b is arrested by a suitable stop before the slide changer 8 reaches its lower end position so that the thus arrested upper claw 8b becomes disengaged from the upper edge portion and that the lower claw 8a can move to a level below and away from the lower edge portion of the frame on that slide which has been lowered back into the tray 4. In the lower end position of the slide changer 8, the claws 8a, 8b are respectively located below and above the path of forward or rearward movement of the magazine 4 so that the latter can be indexed in order to place another slide into registry with the slide changer. Also, the magazine 4 can be withdrawn from the guide 3a when the slide changer 8 dwells in its lower end position; the projector is then ready to accept a fresh magazine. A slide changer whose operation is somewhat similar to that of the slide changer 8 is disclosed in U.S. Pat. No. 3,174,395 to Krull.

As stated above, the gate which is customary in many types of slide projectors to hold slides in operative position can be dispensed with because the claws 8a, 8b can hold a slide 9 in accurate alignment with the units 5 and 6 when the slide changer 8 dwells in its upper end position. As shown in FIG. 1, the claws 8a, 8b are provided with suitably configured (preferably triangular) guide channels or grooves 8A, 8B which accommodate the lower and upper edge portions of the frame on that slide 9 which is being lifted from the magazine 4 and while such slide dwells in iperative position. The channels 8A, 8B were found to be especially suited to hold the slide against any undesirable movement between the units 5 and 6.

Figure 2:
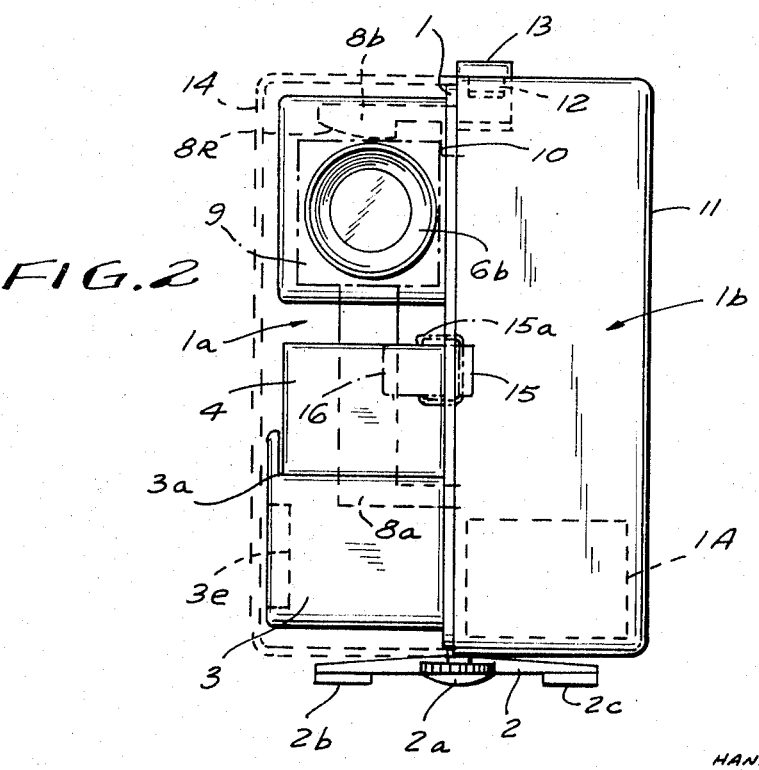
FIG. 2 is a front elevational view of the projector, with the one section of the housing indicated by phantom lines.

The channel 7 is open at that side which is remote from the panel 1 so that the operator of the projector can grasp the frame of the slide 9 which is held in operative position between the claws 8a, 8b. In this way, the operator can invert a slide which happens to be located upside down, and the operator can also remove a slide which is not to be presented to the audience. The operator can then insert a different slide which can be readily introduced into the grooves 8A, 8B because the springs which bias the claws toward each other are relatively weak. Furthermore, the upper claw 8b has a rounded outer portion 8R (FIG. 2) which facilitates the introduction of a fresh slide between the claws while the slide changer 8 dwells in the upper end position shown in FIG. 2. An abutment 10 on the upper claw 8b serves to arrest a freshly inserted slide 9 in the operative position. This abutment also determines the positions of slides which are being lifted from their compartments in the magazine 4.

It is clear that the improved projector can be readily modified to utilize different types of slide changers. For example, the slide changer 8 can be replaced by a slide changer wherein the claws 8a, 8b are replaced by simple pushers (such as the pusher 28 in U.S. Pat. No. 3,125,820 to Maiershofer) which do not grip the slides but merely serve to push a slide from its compartment in the magazine 4 into a gate between the units 5, 6 (such work is performed by the lower pusher) and which thereupon push a slide from the gate back into the corresponding compartment (upper pusher). The projector is then preferably provided with a suitable tunnel in which a slide travels between its compartment and the gate. Such tunnel is preferably provided with an opening in registry with the gate so that a slide which dwells in operative position can be withdrawn in order to be inverted or to be replaced with a different slide. The opening should be large enough to expose a portion of the frame on the slide in operative position so that the frame can be readily grasped by two fingers. The gate includes customary spring-biased pressing means which hold a slide in operative position in accurate alignment with the units 5 and 6. The pressing means must be installed in such a way that they permit withdrawal of a slide in operative position and reinsertion of the same slide or insertion of a different slide without any damage to the slide frame.

Of course, the projector of our invention can be used to project images of slides which are not accommodated in the magazine 4 or which are accommodated in a magazine not supported by the manipulating device 3. The slide changer 8 is then simply moved to its upper end position and the operator inserts and removes as many slides as he wishes whereby a slide which is located in operative position engages with and is properly centered by the claws 8a, 8b. The same applies for a slide projector which includes a slide changer with two pushers and which also includes a gate.

The upper wall of the housing section 11 is formed with slots 11a and with abutments 12 for the end portions of a depressible handle 13 which facilitates transportation of the slide projector. The handle 13 is depressed in a manner as shown in FIG. 1 when the projector is in storage or in actual use; the user then simply engages and exerts a pull on the central portion of the handle 13 until its end portions engage the corresponding abutments 12. The extent to which the handle 13 can be withdrawn is such that is central part can be readily grasped by the fingers of one hand.

The section or shell 14 of the housing is removed when the projector is in use. This section can be readily attached to the frame and/or to the section 11 by means of two disengageable coupling devices including hooked retainers 15 on the section 11 or panel 1 and eyes 15a on the adjoining hinges 16 of the section 14.

Since the magazine 4 is normally removed from the guide means 3a when the projector is put to storage, the space or chamber between the guide means 3a and units 5, 6 can accommodate the electric cable which supplies current to the projector, a remote control cable if the projector is designed to be operated by remote control, and/or one or more other accessories or spare parts. As a rule, the magazine 4, with one or more additional magazines, is stored in a separate receptacle.

An important advantage of the panel 1 is that it supports the units 5, 6, the manipulating device 3, the slide changer 8 and the driving assembly 1b in such a way that each thereof can be readily reached without necessitating removal of the others. This is of particular importance when a freshly assembled projector requires final adjustments and/or when the projector must undergo periodic inspection and/or repair. The projection lamp of the unit 5 can be reached and replaced upon removal of the section 14.

When the section 14 is separably secured to the frame and/or to the section 11, the two sections form a closed housing which protects all sensitive parts of the projector against moisture, dust or damage when the projector is in transport or storage. Consequently, the projector need not be provided with a separate case.

Since the slide which is held in operative position is readily accessible, adjustable and removable, the operator can project the images of slides in the sequence in which the slides are stored in a magazine 4 or the operator can change such sequence at his will by removing one or more slides prior to projection of their images and/or by presenting additional slides.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a slide projector, a combination comprising a frame including an upright supporting panel having a first side and a second side; manipulating means for slide magazines provided at one of said sides and carried by said frame; an illuminating unit and an image-projecting unit, both located at said one side and both carried by said frame, said manipulating means being located at a first level and said units being located at a second level; a slide changer having a slide-engaging portion movable up and down at said one side to transport slides between a magazine in said manipulating means and an operative position of registry with said units; a driving assembly for said slide changer, said assembly being carried by said frame at the other of said sides and including means for withdrawing heat from said illuminating unit; and a housing including a first section separably secured to said frame at said other side of said panel to normally conceal said driving assembly and a second section separably secured to said frame at said one side of said panel to conceal said units, said portion of said slide changer and said manipulating means when the projector is not in use.

2. A combination as defined in claim 1 wherein said manipulating means, said driving assembly and said units are mounted directly on said panel.

3. A combination as defined in claim 1, wherein each of said units constitutes a discrete block and wherein said blocks define a substantially vertical channel for said portion of said slide changer.

4. A combination as defined in claim 1, wherein said illuminating unit comprises a hollow casing and a single fastener separably securing said casing to said panel.

5. A combination as defined in claim 1, wherein said first level is located below said second level and wherein said manipulating means comprises an elongated guide for slide magazines.

6. A combination as defined in claim 5, wherein said manipulating means further comprises a casing secured to said panel and having a recess located below said guide, and further comprising a plurality of control elements accommodated in said recess.

7. A combination as defined in claim 1, wherein said units define a substantially vertical channel for said portion of said slide changer and wherein said channel is wide enough to permit manual withdrawal of a slide which is held in operative position by said portions.

8. A combination as defined in claim 7, wherein said channel has an open side remote from said one side of said panel and wherein a slide which is held in operative position extends away from said one side of the panel and beyond said units to facilitate manual withdrawal of such slide.

9. A combination as defined in claim 1, further comprising handle means provided on said frame.

10. A combination as defined in claim 9, wherein said handle means is movable between at least partly concealed and exposed positions.

* * * * *